United States Patent [19]

Vernam et al.

[11] 3,857,165

[45] Dec. 31, 1974

[54] WELDING ALUMINUM

[75] Inventors: William D. Vernam, New Kensington; William A. Anderson, Pittsburgh, both of Pa.

[73] Assignee: Aluminum Company of America, Pittsburgh, Pa.

[22] Filed: May 4, 1973

[21] Appl. No.: 357,199

[52] U.S. Cl. .................................. 29/504, 148/127
[51] Int. Cl. ............................................ B23k 35/24
[58] Field of Search ...................... 29/504; 148/127

[56] References Cited
OTHER PUBLICATIONS

NASA Technical Memorandum—NASA TMX-64659; Poorman et al., May 10, 1972.
Welding Kaiser Aluminum; First Edition, 1967; Pages 2-27-2-36.

Primary Examiner—Gerald A. Dost
Attorney, Agent, or Firm—Daniel A. Sullivan, Jr.

[57] ABSTRACT

A method of fusion welding structural members of an aluminum alloy parent metal having an essential composition of 0.8 to 7% copper, not more than 3% magnesium, 1.2% silicon, 1.2% manganese, 0.7% iron, 0.15% titanium, 0.15% vanadium, 0.25% zirconium, 0.25% zinc, 0.1% chromium, 0.02% cadmium, 0.05% others each, and 0.15% others total as impurities, balance aluminum, by forming a welded joint between the members with a filler metal having an essential composition of 5 to 7% copper, 1 to 2.5% magnesium, and 0.1 to 3.3% silicon, not more than 0.25% zirconium, 0.15% titanium, 0.8% manganese, 0.7% iron, 0.02% vanadium, 0.25% zinc, 0.1% chromium, 0.05% others each, and 0.15% others total as impurities, balance aluminum.

A method of fusion welding structural members of an aluminum alloy parent metal having an essential composition of 1.2 to 2.6% copper, 1.9 to 2.9% magnesium, and 5.1 to 6.7% zinc, not more than 0.35% chromium, 0.15% zirconium, 0.4% silicon, 0.5% iron, 0.3% manganese, 0.2% titanium, 0.05% others each, and 0.15% others total as impurities, balance aluminum, by forming a welded joint between the members with a weld filler metal having an essential composition of 5 to 7% copper, 1 to 2.5% magnesium, and 1 to 3.3% silicon, not more than 0.25% zirconium, 0.1% titanium, 0.8% manganese, 0.7% iron, 0.02% vanadium, 0.25% zinc, 0.1% chromium, 0.05% others each, and 0.15% others total, balance aluminium.

24 Claims, No Drawings

WELDING ALUMINUM

BACKGROUND OF THE INVENTION

The present invention relates to the fusion welding of aluminum alloy structural members by utilizing an aluminum alloy filler metal. More particularly, the invention is directed to the welding of aluminum alloy structural members which are of plate thickness at the location of the welded joint.

The welding of plate-thickness aluminum alloy material is especially susceptible to the appearance of cracks at the welded joint. Especially this is true in the case of 7075-type aluminum alloy.

SUMMARY OF THE INVENTION

It is an object of the present invention to provide a new method of welding aluminum alloys in the 2XXX and 7XXX series, particularly when these alloys form the material of plate, e.g. 1/2 inch thickness, members which are to be welded together.

These as well as other objects which will become apparent in the discussion which follows are achieved, according to the present invention, by providing:

1. A method of fusion welding structural members of an aluminum alloy parent metal consisting essentially of 0.8 to 7% copper, not more than 3% magnesium, 1.2% silicon, 1.2% manganese, 0.7% iron, 0.15% titanium, 0.15% vanadium, 0.25% zirconium, 0.25% zinc, 0.1% chromium, 0.02% cadmium, 0.05% others each, and 0.15% others total as impurities, balance aluminum, including forming a welded joint between the members with a filler metal consisting essentially of 5 to 7% copper, 1 to 2.5% magnesium, and 0.1 to 3.3% silicon, not more than 0.25% zirconium, 0.15% titanium, 0.8% manganese, 0.7% iron, 0.02% vanadium, 0.25% zinc, 0.1% chromium, 0.05% others each, and 0.15% others total as impurities, balance aluminum.

2. A method of fusion welding structural members of an aluminum alloy parent metal consisting essentially of 1.2 to 2.6% copper, 1.9 to 2.9% magnesium, and 5.1 to 6.7% zinc, not more than 0.35% chromium, 0.15% zirconium, 0.4% silicon, 0.5% iron, 0.3% manganese, 0.2% titanium, 0.05% others each, and 0.15% others total as impurities, balance aluminum, including forming a welded joint between the members with a weld filler metal consisting essentially of 5 to 7% copper, 1 to 2.5% magnesium, and 1 to 3.3% silicon, not more than 0.25% zirconium, 0.1% titanium, 0.8% manganese, 0.7% iron, 0.02% vanadium, 0.1% chromium, 0.05% others each, and 0.15% others total, balance aluminum.

DESCRIPTION OF THE PREFERRED EMBODIMENTS

In the welding of structural members of aluminum base alloys according to the present invention, it is to be understood that conventional fusion joining processes can be employed where the parent members are fused and a filler metal is required to complete the joint. A flux may or may not be needed, depending on the method of welding. A particularly desirable method is that involving use of an arc shielded with an inert gas and in which no flux is employed. The welds of the present invention may be solution heat treated and precipitation hardened, although we have not preferred to do this since the increased strength is obtained at the sacrifice of some ductility.

The present invention is particularly successful in the welding of plate-thickness material, i.e., material having a thickness of at least 1/4 inches. The structural members may be in the solution heat treated and age hardened condition, or simply the age hardened, the hard rolled, the annealed, or the as-fabricated condition, depending upon the requirements demanded in the welded structure. It is also to be understood that cast as well as wrought structural members can be joined according to the present invention.

In general, the filler metal in the present invention is supplied as weld rod in the form of drawn rod or wire. The rod can also be extruded or otherwise formed, or can be cast. The cross sectional dimensions of the rod will depend on the welding equipment used and also on whether the rod is to be flux coated or used in the bare condition.

The performance of welds made according to the present invention have been studied by the following tests.

Tensile tests were performed with full section (weld bead intact), sheet-type tensile specimens having broadened paddle sections at both ends for gripping purposes and a central elongated test section of 1½ inches width, a thickness depending upon the particular parent metal structural members being welded, and a length of approximately 11 inches; this testing was done in general according to the methods set forth in ASTM Specification e8. Except for the case of 2219 parent metal, all tests for the Examples below involved the use of 1/2"-thick plate. Two plates of rectangular shape and measuring 12" × 24" were butt welded together along their long sides. The butt edges were chamfered on both sides to give a 90° included angle. The land width at the abutment interface was 1/16'. Welding was done by the MIG process in the flat position, with the plates clamped in position and with initial tacking at both ends, followed by a first weld pass. After the first pass, the plates were turned over and a second pass was made. Current was 240–250 amperes, voltage 27–30 volts, and insert gas flow 60 ft³/hr (40 ft³/hr he + 20 ft³/hr A). No preheat was used, and the plates were allowed to cool to about 150° F after each pass. Tensile specimens were cut such that the weld bead would run perpendicularly to the specimen length.

In the case of 2219 parent metal, 1/2"-thick plate was again used, but the welding was different in that direct-current, straight polarity TIG welds were made at 330 amperes, 15 volts, with an inert gas flow of 60 ft³/hr He. Only two passes were used.

Welding cracking tendency was determined according to the cracking test described in "Weld Cracking of Alumihum Alloys" by J. D. Dowd, *The Welding Journal Research Supplement*, October, 1952. An inverted I-joint is produced by depositing a fillet of filler metal on both sides of a 1/2 × 4 × 10-inch vertical member resting on a 1 × 4 × 10-inch base member. The welding was done with inert gas shielding using tungsten arc (TIG) or metal arc (MIG) equipment, the filler metal being supplied in the form of wire. The fillet was deposited either continuously using the MIG method or discontinuously using the TIG method. For the continuous test, welding current was 300 amperes, using a 300° F preheat of the members, 27 volts, and an inert gas flow of 17 ft³/hr A + 33 ft³/hr He. In the discontinuous method, the welding is intentionally interrupted and restarted. Welding parameters are the same as for the discontinuous method, except that 50 ft³/hr of argon is used as the inert gas. The lengths of any cracks appearing in or adjacent to the weld beads are measured, their total length determined, and this reported as "inches of cracking." Especially the discontinuous method subjects the weld to very severe conditions, in order to magnify any cracking tendencies of parent or filler metal.

One filler metal for use in the present invention has a composition of 5 to 7% copper, 1 to 2.5% magnesium, and 0.1 to 3.3% silicon, balance aluminum with impurities up to the following maximum percentages: 0.25% maximum zirconium, 0.1% maximum titanium, 0.8% maximum manganese, 0.7% maximum iron, 0.02% maximum vanadium, 0.25% maximum zinc, 0.1% maximum chromium, others each 0.05% maximum, others total 0.15% maximum. Structural members to be welded with this filler metal may be made of several preferred aluminum alloy compositions forming the parent metal in the weld. These parent metal alloys are set forth in Table I as alloy Types I to V.

In the case of Type III alloy, a preferred filler metal composition lies within the following composition limits: 5.8 to 6.8% copper, 1.2 to 1.8% magnesium, 0.4 to 0.8% manganese, 0.04 to 0.15% titanium, and 0.1 to 0.25% zirconium, balance aluminum with impurities up to the following maximum percentages: 0.25% maximum iron, 0.2% maximum silicon, 0.02% maximum vanadium, 0.25% maximum zinc, 0.1% maximum chromium, 0.0008% beryllium, others each 0.05% maximum, others total 0.15% maximum.

In the case of filler metal consisting essentially of 5 to 7% copper, 1 to 2.5% magnesium, and 1 to 3.3% silicon, with impurities being limited to 0.25% maximum zirconium, 0.1% maximum titanium, 0.8% maximum manganese, 0.7% maximum iron, 0.02% maximum vanadium, 0.25% maximum zinc, 0.1% maximum chromium, other impurities each 0.05% maximum, and other impurities total 0.15% maximum, the balance being aluminum, a preferred parent metal composition is Type VI alloy as follows: 1.2 to 2.0% copper, 2.1 to 2.9% magnesium, 0.18 to 0.35% chromium, and 5.1 to 6.1% zinc, with impurities being limited to 0.05% maximum zirconium, 0.4% maximum silicon, 0.5% maximum iron, 0.3% maximum manganese, 0.2% maximum titanium, other impurities each 0.05% maximum, and other impurities total 0.15% maximum, the balance of the parent metal being aluminum.

A preferred filler metal composition for Type VI alloy lies within the following composition limits: 6 to 7% copper, 1.5 to 2.5 % silicon, 1.25 to 1.75% magnesium 0.6 to 0.8% manganese, 0.02 to 0.1% titanium, and 0.1 to 0.25% zirconium, balance aluminum with impurities up to the following maximum percentages: 0.25% maximum iron, 0.02% maximum vanadium, other each 0.05% maximum, others total 0.15% maximum.

Further illustrative of the present invention are Examples I to X. Table II gives the parent metal and filler metal for each of these examples, together with the obtained strengths, elongations, and inches of cracking. Table III provides the compositions of the particular aluminum alloys designated by capital letters in the columns "Parent Metal" and "Filler Metal" in Table II; heat treatment has also been indicated where significant. Further included in Table III is the Aluminum Association alloy designation, where such exists.

Table I

Parent Metal Aluminum Alloy Compositions
(Values are in %)

|  | Type I | Type II | Type III | Type IV | Type V |
|---|---|---|---|---|---|
| Cu | 2.2–3.0 | 3.9–5.0 | 5.8–6.8 | 3.8–4.9 | 0.8–1.4 |
| Mg | 0.2–0.5 | 0.2–0.8 | .02 max. | 1.2–1.8 | 2.0–3.0 |
| Si | 0.8 max. | 0.5–1.2 | 0.2 max. | 0.5 max. |  |
| Mn | 0.2 max. | 0.4–1.2 | 0.2–0.4 | 0.3–0.9 | 0.1–0.5 |
| Fe | 0.7 max. | 0.7 max. | 0.3 max. | 0.5 max. |  |
| Fe + Si |  |  |  |  | 0.4 max. |
| Ti | 0.05 max. | 0.15 max. | 0.02–0.1 | 0.05 max. | 0.05 max. |
| V | 0.05 max. | 0.05 max. | 0.05–0.15 | 0.05 max. | 0.05 max. |
| Zr | 0.05 max. | 0.05 max. | 0.10–0.25 | 0.05 max. | 0.05 max. |
| Zn | 0.25 max. | 0.25 max. | 0.10 max. | 0.25 max. | 0.25 max. |
| Cr | 0.1 max. | 0.1 max. | 0.05 max. | 0.1 max. | 0.1 max. |
| Others (except Al) Each | 0.05 max. | 0.05 max. | 0.05 max. | 0.05 max. | 0.05 max. |
| Others (except Al) Total | 0.15 max. | 0.15 max. | 0.15 max. | 0.15 max. | 0.15 max. |
| Al | Bal. | Bal. | Bal. | Bal. | Bal. |

Table II

Examples of the Invention

| Example No. | Parent Metal | Filler Metal | Weld Tensile Strength, in PSI × 10⁻³ | Weld Yield Strength, in PSI × 10⁻³ | % Elongation in 2" | % Elongation in 10" | Inches of Cracking Continuous | Inches of Cracking Discontinuous |
|---|---|---|---|---|---|---|---|---|
| I | A | L | 45.1 | 38.1 | 4.5 | 1.0 | 0 | 0 |
| II | A | H | 46.2 | 39.4 | 5.2 | 1.2 | # | # |
| III* | B | L | 44 | 39.5 | 4.5 | 1.15 | # | # |
| IV* | C | L | 47 | 44 | 2.5 | 0.75 | 0 | 0 |
| V | D | L | 42 | 35 | 6.5 | 1.8 | # | # |
| VI* | F | G | 40.5 | 35.5 | 2.0 | 1.0 | 0 | 0 |
| VII | F | I | 38 | 30 | 2.0 | 1.0 | # | # |
| VIII | F | J | 35 | 28 | 2.0 | 1.0 | # | # |
| IX | F | K | 32 | 29 | 1.5 | 0.5 | # | # |
| X | E | L | # | # | # | # | 0 | 0 |

* Data represent the average values from two tests.
Test not made; none of the welded plates from which the tensile test specimens were taken exhibited cracking.

Table III

Alloy Compositions and Heat Treatment

| Element | A | B | C | D | E | F | G | H | I | J | K | L |
|---|---|---|---|---|---|---|---|---|---|---|---|---|
| Si | .1 | .08 | .9 | .5 | .2 | .15 | 2.05 | .2 | 2.0 | 3.01 | 2.0 | 1.98 |
| Fe | .15 | .22 | .32 | .23 | .2 | .15 | .15 | .08 | .1 | .15 | .1 | .13 |
| Cu | 6.25 | 1.04 | 4.5 | 2.65 | 4.5 | 1.60 | 6.70 | 6.57 | 5.0 | 6.05 | 6.4 | 6.05 |
| Mn | .28 | .24 | .8 | .02 | .65 | .04 | .73 | .6 | .3 | .00 | .3 | .00 |
| Mg | .01 | 2.57 | .5 | .3 | 1.5 | 2.5 | 1.51 | 1.48 | 1.5 | 1.5 | 2.0 | 1.52 |
| Cr |  |  | .02 | .02 | .05 | .22 | .00 | .001 |  |  |  | .00 |
| Zn | .05 |  | .1 | .1 | .05 | 5.75 | .01 |  |  |  |  | .01 |
| Ti | .06 | .03 | .05 | .02 | .02 | .03 | .06 | .025 | .03 | .03 | .03 | .00 |
| Zr | .15 |  |  |  |  |  | .17 | .13 |  |  |  |  |
| V | .1 |  |  |  |  |  | .01 | .003 |  |  |  |  |
| Be | .001 |  | .001 | .001 | .001 | .003 |  |  |  |  |  |  |
| Ni |  |  | .02 | .02 | .02 |  | .00 |  |  |  |  | .00 |
| Al | Bal. | Bal. | Bal. | Bal. | Bal. | Bal. | Bal. | Bal. | Bal. | Bal. | Bal. | Bal. |
| Heat Treatment | T87 | T6 | T6 | T6 |  | T6 |  |  |  |  |  |  |
| Aluminum Association Designation | 2219 |  | 2014 | 2217 | 2024 | 7075 |  |  |  |  |  |  |

All percentages herein are percentages by weight, unless indicated otherwise.

The symbol " is used herein to indicate measurement in inches.

It will be understood that the above description of the present invention is susceptible to various modifications, changes, and adaptations and the same are intended to be comprehended within the meaning and range of equivalence of the appended claims.

What is claimed is:

1. A method of fusion welding structural members of an aluminum alloy parent metal consisting essentially of 0.8 to 7% copper, not more than 3% magnesium, 1.2% silicon, 1.2% manganese, 0.7% iron, 0.15% titanium, 0.15% vanadium, 0.25% zirconium, 0.25% zinc, 0.1% chromium, 0.02% cadmium, 0.05% others each, and 0.15% others total as impurities, balance aluminum, comprising forming a welded joint between said members with a filler metal consisting essentially of 5 to 7% copper, 1 to 2.5% magnesium, and 0.1 to 3.3% silicon, not more than 0.25% zirconium, 0.15% titanium, 0.8% manganese, 0.7% iron, 0.02% vanadium, 0.25% zinc, 0.1% chromium, 0.05% others each, and 0.15% others total as impurities, balance aluminum.

2. The method as claimed in claim 1, wherein the copper of said parent metal is present at 2.2 to 3.0%, and magnesium at 0.2 to 0.5%, with the following reduced impurity limits: not more than 0.8% silicon, not more than 0.2% manganese, not more than 0.05% titanium, not more than 0.05% vanadium, and not more than 0.05% zirconium.

3. A method as claimed in claim 1, wherein the copper of said parent metal is present at 3.9 to 5.0%, maagnesium at 0.2 to 0.8%, silicon at 0.5 to 1.2%, and manganese at 0.4 to 1.2%, with the following reduced impurity limits: not more than 0.05% vanadium and not more than 0.05% zirconium.

4. A method as claimed in claim 1, wherein the copper of said parent metal is present at 5.8 to 6.8%, manganese at 0.2 to 0.4 %, titanium at 0.02 to 0.1%, vanadium at 0.05 to 0.15%, and zirconium at 0.1 to 0.25%, with the following reduced impurity limits: not more than 0.02% magnesium, not more than 0.2% silicon, not more than 0.3% iron, not more than 0.1% zinc, and not more than 0.05% chromium.

5. A method as claimed in claim 4, wherein the copper of said filler metal is present at 5.8 to 6.8%, magnesium at 1.2 to 1.8%, manganese at 0.4 to 0.8%, titanium at 0.04 to 0.15%, and zirconium at 0.1 to 0.25%, with the following reduced impurity limits: not more than 0.25% iron, not more than 0.2% silicon, and not more than 0.0008% beryllium.

6. A method as claimed in claim 1, wherein the copper of said parent metal is present at 3.8 to 4.9%, magnesium at 1.2 to 1.8%, and manganese at 0.3 to 0.9%, with the following reduced impurity limits: not more than 0.5% silicon, not more than 0.5% iron, not more than 0.05% titanium, not more than 0.05% vanadium and not more than 0.05% zirconium.

7. A method as claimed in claim 1, wherein the copper of said parent metal is present at 0.8 to 1.4%, magnesium at 2.0 to 3.0%, and manganese at 0.1 to 0.5%, with the following reduced impurity limits: not more than 0.4% iron plus silicon, not more than 0.05% titanium, not more than 0.05% vanadium, and not more than 0.05% zirconium.

8. A method as claimed in claim 1, wherein said structural members are at least 1/4-inch thick at the welded joint.

9. A method of fusion welding structural members of an aluminum alloy parent metal consisting essentially of 1.2 to 2.6% copper, 1.9 to 2.9% magnesium, and 5.1 to 6.7% zinc, not more than 0.35% chromium, 0.15% zirconium, 0.4% silicon, 0.5% iron, 0.3% manganese, 0.2% titanium, 0.05% others each, and 0.15% others total as impurities, balance aluminum, comprising forming a welded joint between said members with a weld filler metal consisting essentially of 5 to 7% copper, 1 to 2.5% magnesium, and 1 to 3.3% silicon, not more than 0.25% zirconium, 0.1% titanium, 0.8% manganese, 0.7% iron, 0.02% vanadium, 0.25% zinc, 0.1% chromium, 0.05% others each, and 0.15% others total, balance aluminum.

10. A method as claimed in claim 9, wherein the copper of said parent metal is present at 1.2 to 2.0%, magnesium at 2.1 to 2.9%, chromium at 0.18 to 0.35%, and zinc at 5.1 to 6.1%, with the following reduced impurity limit: not more than 0.05% zirconium.

11. A method as claimed in claim 10, wherein the copper of said filler metal is present at 6 to 7%, silicon at 1.5 to 2.5%, magnesium at 1.25 to 1.75%, manganese at 0.6 to 0.8%, titanium at 0.02 to 0.1 %, and zirconium at 0.1 to 0.25%, with the following reduced impurity limit: not more than 0.25% iron.

12. A method as claimed in claim 9, wherein said structural members are at least 1/4-inch thick at the welded joint.

13. A fusion welded structure comprising structural members of an aluminum alloy parent metal consisting essentially of 0.8 to 7% copper, not more than 3% magnesium, 1.2% silicon, 1.2% manganese, 0.7% iron, 0.15% titanium, 0.15% vanadium, 0.25% zirconium, 0.25% zinc, 0.1% chromium, 0.02% cadmium, 0.05% others each, and 0.15% others total as impurities, balance aluminum, and a joint between said members formed by fusion welding with a filler metal consisting essentially of 5 to 7% copper, 1 to 2.5% magnesium, and 0.1 to 3.3% silicon, not more than 0.25% zirconium, 0.15% titanium, 0.8% manganese, 0.7% iron, 0.02% vanadium, 0.25% zinc, 0.1% chromium, 0.05% others each, and 0.15% others total as impurities, balance aluminum.

14. A structure as claimed in claim 13, wherein the copper of said parent metal is present at 2.2 to 3.0%, and magnesium at 0.2 to 0.5%, with the following reduced impurity limits: not more than 0.8% silicon, not more than 0.2% manganese, not more than 0.05% titanium, not more than 0.05% vanadium, and not more than 0.05% zirconium.

15. A structure as claimed in claim 13, wherein the copper of said parent metal is present at 3.9 to 5.0%, magnesium at 0.2 to 0.8%, silicon at 0.5 to 1.2%, and manganese at 0.4 to 1.2%, with the following reduced impurity limits: not more than 0.05% vanadium and not more than 0.05% zirconium.

16. A structure as claimed in claim 13, wherein the copper of said parent metal is present at 5.8 to 6.8%, manganese at 0.2 to 0.4%, titanium at 0.02 to 0.1%, vanadium at 0.05 to 0.15%, and zirconium at 0.1 to 0.25%, with the following reduced impurity limits: not more than 0.02% magnesium, not more than 0.2% silicon, not more than 0.3% iron, not more than 0.1% zinc, and not more than 0.05% chromium.

17. A structure as claimed in claim 16, wherein the copper of said filler metal is present at 5.8 to 6.8%, magnesium at 1.2 to 1.8%, manganese at 0.4 to 0.8%, titanium at 0.04 to 0.15%, and zirconium at 0.1 to 0.25%, with the following reduced impurity limits: not more than 0.25% iron, not more than 0.2% silicon, and not more than 0.0008% beryllium.

18. A structure as claimed in claim 13, wherein the copper of said parent metal is present at 3.8 to 4.9%, magnesium at 1.2 to 1.8%, and manganese at 0.3 to 0.9%, with the following reduced impurity limits: not more than 0.5% silicon, not more than 0.5% iron, not more than 0.05% titanium, not more than 0.05% vanadium, and not more than 0.05% zirconium.

19. A structure as claimed in claim 13, wherein the copper of said parent metal is present at 0.8 to 1.4%, magnesium at 2.0 to 3.0%, and manganese at 0.1 to 0.5%, with the following reduced impurity limits: not more than 0.4% iron plus silicon, not more than 0.05% titanium, not more than 0.05% vanadium, and not more than 0.05% zirconium.

20. A structure as claimed in claim 13, wherein said structural members are at least 1.4-inch thick at the welded joint.

21. A fusion welded structure comprising structural members of an aluminum alloy parent metal consisting essentially of 1.2 to 2.6% copper, 1.9 to 2.9% magnesium, and 5.1 to 6.7% zinc, not more than 0.35% chromium, 0.15% zirconium, 0.4% silicon, 0.5% iron, 0.3% manganese, 0.2% titanium, 0.05% others each, and 0.15% others total as impurities, balance aluminum, and a joint between said members formed by fusion welding with a weld filler metal consisting essentially of 5 to 7% copper, 1 to 2.5% magnesium, and 1 to 3.3% silicon, not more than 0.25% zirconium, 0.1% titanium, 0.8% manganese, 0.7% iron, 0.02% vanadium, 0.25% zinc, 0.1% chromium, 0.05% others each, and 0.15% others total, balance aluminum.

22. A structure as claimed in claim 21, wherein the copper of said parent metal is present at 1.2 to 2.0%, magnesium at 2.1 to 2.9%, chromium at 0.18 to 0.35%, and zinc at 5.1 to 6.1%, with the following reduced impurity limit: not more than 0.05% zirconium.

23. A structure as claimed in claim 22, wherein the copper of said filler metal is present at 6 to 7%, silicon at 1.5 to 2.5%, magnesium at 1.25 to 1.75%, manganese at 0.6 to 0.8%, titanium at 0.02 to 0.1%, and zirconium at 0.1 to 0.25%, with the following reduced impurity limit: not more than 0.25% iron.

24. A structure as claimed in claim 21, wherein said structural members are at least 1/4-inch thick at the welded joint.

* * * * *

UNITED STATES PATENT OFFICE
CERTIFICATE OF CORRECTION

Patent No. 3,857,165    Dated December 31, 1974

Inventor(s) William D. Vernam and William A. Anderson

It is certified that error appears in the above-identified patent and that said Letters Patent are hereby corrected as shown below:

| | |
|---|---|
| Col. 2, line 29 | Change "e8" to --E8--. |
| Col. 2, line 35 | Change "1/16' " to --1/16"--. |
| Col. 2, line 41 | Change "insert" to --inert--. |
| Col. 2, line 42 | Change "he" to --He--. |
| Col. 2, lines 56-57 | Change "I-joint" to --T-joint--. |
| Claim 3, lines 2-3 | Change "maagnesium" to --magnesium--. |
| Claim 20, line 2 | Change "1.4" to --1/4--. |

Signed and sealed this 4th day of March 1975.

(SEAL)
Attest:

RUTH C. MASON
Attesting Officer

C. MARSHALL DANN
Commissioner of Patents
and Trademarks